United States Patent [19]

Miyata et al.

[11] 4,268,131

[45] * May 19, 1981

[54] FIBER COLLAGEN CONTACT LENS

[75] Inventors: Teruo Miyata, Tokyo, Japan; Albert L. Rubin; Kurt H. Stenzel, both of Englewood, N.J.; Michael W. Dunn, New Rochelle, N.Y.

[73] Assignee: Opticol Corporation, Stamford, Conn.

[*] Notice: The portion of the term of this patent subsequent to Sep. 23, 1997, has been disclaimed.

[21] Appl. No.: 29,091

[22] Filed: Apr. 11, 1979

[51] Int. Cl.$^3$ .................. C08H 1/06; C09H 1/04; G02C 7/04

[52] U.S. Cl. .................. 351/160 H; 260/117; 435/273

[58] Field of Search .................. 351/160–162; 435/273; 260/117

[56] References Cited

U.S. PATENT DOCUMENTS

| | | | |
|---|---|---|---|
| 3,314,861 | 4/1967 | Fujii | 260/117 |
| 3,443,261 | 5/1969 | Battista | 351/160 H |
| 3,530,037 | 9/1970 | Nishihara | 351/160 H |
| 3,760,045 | 9/1973 | Thiele et al. | 351/160 |
| 3,955,012 | 5/1976 | Okamura et al. | 351/160 H |

FOREIGN PATENT DOCUMENTS 49-39174 10/1974 Japan .................. 351/160 H

*Primary Examiner*—John K. Corbin
*Assistant Examiner*—Scott J. Sugarman
*Attorney, Agent, or Firm*—Edward J. Mahler

[57] ABSTRACT

Soft contact lenses are made from purified fiber collagen and mixtures of such fiber with purified solubilized collagen.

7 Claims, No Drawings

FIBER COLLAGEN CONTACT LENS

This invention relates to a soft contact lens consisting of a collagen gel in which the collagen gel is prepared from fiber collagen, and from mixtures of fiber collagen with solubilized collagen.

Collagen constitutes about 20 to 30 percent of the total body protein in vertebrates. It is a fibrous protein and functions primarily as a supporting tissue and scaffolding for other proteins and cells. It is present throughout the body but exists in high concentrations in skin, tendon and bone.

Collagen is recovered from these tissues by a variety of techniques the oldest know method being the boiling of the tissue in water which denatures some of the collagen and forms the well-known gelatin on cooling. For use as a biomaterial however, collagen must be recovered in native, undenatured form, i.e., with little or no destruction of the basic rigid triple helical structure; (tropocollagen).

Undenatured native collagen is recovered principally by two methods, (a) solution by dissolving the collagen in acids, bases, salts or by enzyme digestion in which instances the collagen becomes actually dissolved, and (b) extraction in solid, undissolved, fiber form usually by the action of aqueous salt on minced, comminuted collagen raw material to produce a dispersion from which the solid is recovered by centrifuge, etc. Both the solution and extraction methods are well described in the collagen art.

The chemistry, molecular structure and biochemical properties of collagen have been well established. An up-to-date review article by the current inventors (Annual Review of Biophysics and Bioengineering, Vol. 3, p 231–253, 1974) contains an excellent compilation of references on the subject.

Contact lenses have been known as a commercial product for over 25 years. Contact lenses to date have been made from chemically synthesized materials which do not occur in nature. For example, most early contact lenses were made from polymethylmethacrylate or chemical modifications thereof, from hydroxyethylmethacrylate, from cellulose acetate butyrate, from silicones, etc. To the knowledge of the applicants no lens, prior to their own inventions, was made from naturally occurring animal materials and especially from materials having physiological and immunological properties possessed by constituents of the eye itself, e.g., the cornea. The state of the art on contact lenses is reviewed in a current article "A Contact Lens Update'-'—Contact Lens Forum, p. 16–23 (May 1976).

In copending application Ser. No. 026,945 filed Apr. 4, 1979 now U.S. Pat. No. 4,223,984 granted Sept. 23, 1980 which is a continuation of Ser. No. 753,556 filed Dec. 22, 1976 now abandoned, there is described and claimed a collagen gel contact lens in which the collagen is made from reconstituted, solubilized telopeptide-poor, defatted collagen, particularly enzyme-solubilized collagen.

We have now discovered that a soft contact lens of improved strength and improved resistance to bacteria attack is produced from purified fiber collagen, and from fiber collagen-solubilized collagen mixtures. The above improved properties are of great value when producing extended-wear disposable lenses. Applicants' preferred fiber collagen is fiber collagen made from beef leg tendon, while the preferred solubilized collagen for use in mixtures therewith is enzyme-solubilized type. Tendon collagen is relatively purer and more resistant to decomposition in that it is by nature more firmly cross-linked; while enzyme solubilization produces greater yields of extracted collagen and at the same time digests telopeptides and other undesirable bodies such as mucopolysaccharides, saccharides and other contaminating proteins.

Applicants have found that fiber collagen and fiber collagen-solubilized collagen gel mixtures appear to have greater resistance to bacteria than solubilized collagen gels alone. The difference, which is of great importance when such gels are formed into contact lenses for human use, is believed to be due to the greater extent of cross-linking of the native fiber collagen molecule and its resistance to decomposition when exposed to the rigors of additional crosslinking whether conducted by radiation or by chemical means. Applicants have frequently found that if the crosslinking by radiation is too severe the resulting collagen gels and lenses made therefrom are susceptible to bacteria growth thereon or in some cases to liquefaction or destruction by bacteria. It is believed that breakges in the linkages of the triple helix structure of the collagen molecule occur under too severe irradiation crosslinking conditions and provide sites that are susceptible to the action of proteolytic enzymes of bacterial origin.

When describing the collagens as purified, applicants mean to imply that the collagens prior to conversion to viscous solutions, are treated, either during their recovery stage or thereafter, for the removal of telopeptides, saccharides, mucopolysaccharides and other contaminating proteins. In addition the recovered collagens must be relatively free of lipids and fats, preferably by subjecting them to de-lipid and defatting solvents. Most animal collagen, of whatever type, contains at least small amounts of fats, and applicants make no distinction in the use herein of the terms defatted, fat-free or fat-poor.

When making collagen lenses from mixtures of fiber collagen and solubilized collagen the amounts of each present in the collagen mixture is not critical. The ratio of fiber to solubilized collagen may vary from 10 to 1 to 1 to 10; however, applicants prefer mixtures in the 40–60, 60–40 wt. % ranges.

RECOVERY OF COLLAGENS FROM CRUDE SOURCE

The method of obtaining solubilized or fibril collagens from the crude collagen source, e.g. skin, tendon, hide, etc., is not critical, and some flexibility may be used in the selection of the particular tissue and the method applied thereto; for example, applicants prefer enzyme extraction when preparing solubilized collagen regardless of the nature of the tissue.

(A) Solubilized Collagen

The greater part of native collagen is insoluble, but can be solubilized in dilute acids, e.g. acetic acid; in bases e.g. NaOH; and in dilute aqueous salts, e.g. NaCl. In all relatively low yields are obtained. All processes are well known in the collagen extraction art. Since applicants prefer enzyme extraction as the better method of obtaining solubilized collagen for their mixed collagen gel lenses, this extraction process will be described in more detail than the others.

(i) Acid extraction

Collagen tissue of young animal such as calfskin contains about 1–2% acid soluble collagen. This collagen is extracted by pH 2–4 aqueous acid solution such as 0.1 acetic acid or 0.15 M citrate buffer pH 3.6. But this is not economical because yield of collagen is so small.

(ii) Base extraction

Corium layer of hide is soaked in 4% NaOH containing 0.2 M monomethylamine and 15% sodium sulfate for 10–15 days at room temperature. The hide is washed with water to remove bases and then extracted by stirring in 0.1 N acetic acid - 0.1 M NaCl, pH 2.8.

Almost all the hide is dissolved and a viscous solution is obtained. This collagen is precipitated by raising the pH to 4-5, collected by centrifugation and washed with water. After dehydration with ethanol, the collagen is treated with ethanol-ether (1:1) to remove fat. After air-drying, collagen is dissolved in an acidic aqurous solution, pH 2–4, and filtered through millipore filters up to $0.65\mu$ pore size. The collagen is precipitated at pH 4-5 and collected by centrifugation. Finally 4–10% collagen gels in acidic aqueous medium, pH 2–4 are prepared for lens production.

(iii) Salt extraction

Collagen can be extracted from tissue by treatment with salt solutions, e.g. dilute aqueous NaCl, but the yields are poor as in the case of acid extraction, and this procedure is not recommended.

(iv) Enzyme extraction

For reasons previously enumerated enzyme extraction is the preferred method for recovering collagen by the solution process.

Cleaned, de-haired hide or skin is cut into pieces of workable size and slurried in acidified water in the presence of a proteolytic enzyme (other than collagenase). Suitable enzymes are pepsin, trypsin, pronase, proctase, etc. Two fractions are obtained from this digestion, one an insoluble solid fraction which is discarded, and a solution or soluble fraction which is worked up as follows. The solution is brought to a pH of about 10.0 to denature the remaining active enzyme, and then neutralized to a pH of about 6.0–7.0. "Atelocollagen" precipitates at this pH leaving behind in solution (to be discarded) the digested telopeptides, and other contaminating proteins, and any saccharides, mucopolysaccharides, etc. The atelocollagen is usually further purified by repeating solubilization at pH 2–3 and reprecipitation at pH 6–7. The recovered collagen is then washed with ethanol to remove any lipid content and excess water in preparation for the solvent defatting process. The collagen is defatted by treatment with 1:1 ethanol-ethyl ether mixture and recovered as a viscous solid usually by cheesecloth filtering. It is then air-dried, and subsequently converted to gel by solubilization in acidified water at a pH of about 3.0

(B) Fiber Collagen

Native collagen is also recovered in fiber form (not dissolved at all) by dispersion of the collagen in an aqueous medium and recovery by some means such as centrifuging, etc. Fiber collagen is usually recovered from animal tendon or hide as opposed to skin or bone source. Tendon, e.g. is de-sheathed, sliced and homogenized to separate individual tendon fibers in specialized "micro-cut" machines. Water is present during the machining of the tendon and the fibers become dispersed therein. The dispersion is repeatedly (2 or 3X) washed with dilute salt solution (5% NaCl) and the collagen fibers recovered by centrifuging. The fibers are washed with water to remove salt preparatory to enzyme treatment. The dispersion is treated with pancreatin, an enzyme which is very effective in dissolving elastin which encircles the fibers and binds them together. Other undesirable components, as mentioned above, are also digested during this enzyme treatment which is carried out for about 24 hours at room temperature at pH of about 7–8 and enzyme concentration of 0.5 wt. % based on the weight of dry collagen. After recovering the collagen fibers by centrifuge, the fibers are washed with dilute aqueous salt solution and finally with water after which they are defatted. The product is recovered from the defatting solvent, dried in air, powdered and swollen at 1–3% concentrations in dilute HCl or citric acid (pH about 2–3). For conversion of the fibers to finer collagen fibrils from which lens are eventually made, the fibers are homogenized by mortar action, whereupon they become homogenous and transparent, and the product is a clear, viscous pourable dispersion.

Hide collagen is worked up in the same manner as tendon collagen to produce fibers therefrom, but in doing so it is recommended that the hair side and flesh side be cut away and only the corium layer used.

Fiber collagen possesses high tensile strength and its high degree of natural crosslinking makes it easier to purify without degradation, particularly, during enzyme treatment wherein a milder acting enzyme is used and in any finishing crosslinking operation.

Collagen (solubilized or fiber) contains many $NH_2$ and COOH groups in its structure and chemical modifications of the molecule can be readily made, e.g., all or some of the amino groups may be acylated by reaction with a mixture of acetic anhydride and acetic acid, or other anhydride such as succinic anhydride. All or some of the carboxyl groups contained in the molecule may be esterified by the standard reaction with acidified alcohol, preferably a water-soluble, aliphatic alcohol, such as methanol, ethanol, etc. In the above reactions the isoelectric point of collagen can be controlled, either negative or positive, or completely neutralized. Excellent soft contact lenses have been made from collagens which have been succinylated and methylated prior to crosslinking.

Gels having collagen concentrations ranging from 1% to 30 wt. % can be utilized for fiber or fiber-solubilized collagen lens production, but the preferable concentration is 1% to 20% with the balance being water. In general gels made from fiber collagen exhibit greater physical strength characteristics than gels made from solubilized collagens of the same collagen concentrations. Therefore, fiber collagen gel lenses can be made with lower collagen concentrations and higher water contents without risking loss of desired properties. As the collagen content of the gel increases substantially above about 15–20%, the material becomes gummy and difficult to handle and work. A collagen soft contact lens of higher water content is more pliable, superior in oxygen diffusion, and more comfortable to wear. However, in general the mechanical strength of the lens is improved with decreasing water content.

CROSSLINKING

Crosslinking of the solubilized transparent collagen is necessary to stabilize the molecule. Crosslinking is accomplished by irradiation with gamma or ultraviolet rays (preferably in the presence of a nitrogen atmosphere) or by heating, drying or simple aging. Nitrogen atmosphere is preferred to air because the presence of nitrogen increases the crosslinking of collagen while maintaining the rate of breakdown of collagen at a low level. Crosslinking can also be accomplished by treating with certain chemicals such as aldehydes, e.g., formaldehyde, glutaraldehyde, glyoxal, acrolein, dialdehyde-starch, or with tanning acids such as chromic acid. The mechanism of crosslinking of collagen is well-known and has been fairly well documented. In the preparation of soft contact lenses in accordance with this invention, the preferred crosslinking method depends on the type of collagen being crosslinked. Irradiation is preferred to chemical treatment in certain cases since the irradiation process introduces no potentially toxic foreign material into the collagen gel structure.

The effectiveness of gamma-irradiation is a function of the collagen concentration of the gel, the atmosphere in which the irradiation is carried out and the irradiation dose. For example, gamma-irradiation in presence of air induces some damage of the collagen molecule (believed to be destruction of the bonds in the triple helix) concurrent with introduction of crosslinkages. Irradiation in the presence of nitrogen minimizes such destruction, and enhances gel stabilization by crosslinking. The optimal irradiation dose depends on the collagen concentration. Irradiation of 500-900 K rads at a dose rate of 82 K rads per hour is necessary to introduce enough crosslinkages into 5% collagen gel; however, a dose of 1200-1600 K rads is required for 10% collagen gel in presence of nitrogen.

Chemically modified collagens can also be used as a fibril or solubilized collagen lens material as well as native collagen (without chemical modification). Since native collagen is soluble at acidic pH a clear gel is obtained only below about pH 4.0. Lens material made from this gel must be neutralized. On the other hand, chemically modified collagen such as succinylated collagen, or methylated collagen is soluble under physiologic conditions (pH 6-8); and neutralization of the lens material is not necessary. The effect of crosslinking is similar on native and chemically modified collagens.

When crosslinking via irradiation, the same is carried out preferably in the lens mold simultaneously with the molding forming of the molded lens. When chemical crosslinking means are employed the crosslinking is carried out during the lens shaping process. For example, collagen gel of pH 6.2 is de-aerated by centrifugation (4000 rpm for 60 minutes). The crosslinking agent, e.g., 10% acrolein solution, (0.1 M citrate, pH 6.2) was mixed with the gel at a collagen to acrolein ratio of 1 vs. 0.067 on a dry basis.

The material was again de-aerated by centrifugation at 4000 rpm for about 10-20 minutes. The de-aerated gel was then shaped into lens form and permitted to react slowly for about 16 hours in a cold room and finally 10 hours at room temperature. Excess crosslinking agent was removed by washing the lens with 0.1 M citrate solution, pH 6.2 with a phosphate buffer pH 7.0 and finally with saline solution.

Glass, stainless steel, brass and plastics (teflon, polyethylene, polycarbonate) may be used as a lens mold material. Glass and metals are generally preferable to plastics because of the stability against gamma-irradiation.

The present invention may be further understood from the following examples:

FIBER COLLAGEN

EXAMPLE 1

Tendon such as achilles tendon is obtained from the leg of beef animals. Tendon from other animals such as pigs is also useful. The sheath of achilles tendon is removed by cutting with scissors. The Y-shaped tendon without the sheath is sliced (1-2 mm thickness) by a meat slicer. The sliced tendon is treated with Stephan Micro-Cut MVD machine (A. Stephan U. Sohne Gmbh and Co. West Germany) to homogenize and separate individual tendon fibers. The machine clearance settings through which the tendons are processed are sequentially coarse, medium and fine. Some water must be used with tendon for this treatment.

Tendon fiber dispersion after micro-cut treatment is washed in 5% NaCl solution for 2-3 hours and the collagen is collected by centrifugation. Washing with NaCl is repeated two or three times.

Finally the collagen is washed with water to remove NaCl. The washed collagen is treated with pancreatin to remove telopeptides, saccharides and proteins other than collagen, etc. at an enzyme concentration of 0.5% wt. of dry collagen for 1 day at room temperature at pH 7-8.

The enzyme-treated collagen is collected by centrifugation and washed with 5% NaCl and finally with water. Then the collagen is treated with ethanol to remove water and lipid, then with 1:1 mixture of ethanol and ether to remove lipid or fat. Ethanol-ether extraction is carried out at room temperature with stirring for 1 day.

The fiber collagen is collected by centrifugation, air-dried, and powdered in a Wiley Mill into small particle size. The powdered collagen is swollen in citric acid or HCl solution pH 2-3. The collagen concentration is 1-3% in acidic aqueous solution. To disperse collagen fiber into finer fibrils, the powdered swollen collagen is ground in a mortar. The ground collagen becomes homogeneous and transparent and forms a clear, viscous dispersion in water.

This transparent tendon fibril is stabilized by gamma ray irradiation or by chemical crosslinking, and converted, after pouring into a mold into a collagen gel lens as per Example 3 below.

EXAMPLE 2

Hide collagen was also treated in the same way as tendon collagen. Younger hide such as calf skin collagen is better for production of lens grade gel than adult animal collagen. In case of the hide, the hair side and flesh side of hide are removed by cutting and only the corium layer of hide was used as a starting material.

Lenses prepared from tendon and hide collagen fibers were clear, flexible, stable, optically suitable and generally resistant to bacteria. They displayed excellent properties as a soft contact lens.

EXAMPLE 3

Fresh calfskin (about 5 kg.) was dehaired, cleaned by shaving and cut into small pieces. The skin was solubilized in 10 liters of water (pH 2.5, HCl) by addition of 1 g of pepsin (approximate ratio of enzyme to collagen is 1/400) and kept at 20° C. for five days with intermittent stirring. The resulting viscous solubilized collagen was filtered through cheesecloth, its pH adjusted to 10 (NaOH) and allowed to stand for 24 hours at 4° C. to inactivate the pepsin. The pH of the collagen was then adjusted to 7 to 8 (HCl) and collagen precipitate was collected by centrifuging. Fatty constituents were then removed from the collagen. To one part of collected collagen was added two parts of fat solvent, e.g., ethanol-ethyl ether mixture (1:1) and the mixture was homogenized in a Waring blender. Collagen was separated from solvent by squeezing in cheesecloth and homogenized again with the same volume of solvent. After being squeezed it was air dried to remove solvent and redissolved in acidified water (pH about 3.0) to make a viscous pourable collagen gel.

A 50–50 mixture of 0.2 g. 5% clear collagen gel of this Example 3 and of the viscous dispersion of Example 1 was placed on the lower concave part of a lens mold (glass) and centrifuged for 30 minutes at 3000 rpm at 10° C. to make the collagen gel spread evenly across the mold surface. After 10 minutes evacuation in vacuum, the upper convex part of the lens mold was pushed onto the lower mold containing the collagen gel and the entire mold transferred to an irradiation vessel. The vessel was flushed and filled with nitrogen and gamma-irradiated for 10 hours at a dose rate of 82 K rads per hour. The molded collagen lens was neutralized with phosphate-saline buffer, (pH 7.2) and transferred to normal saline. The lens was placed on the convex part of a teflon mold, frozen and trephined while the lens was frozen. The finished lens was kept in normal saline solution. This lens is optically clear, flexible and stable, and displays excellent properties as a soft contact lens and showed no deterioration when exposed to bacteria that produce enzymes.

Irradiation is carried out in a Gammator M type gamma irradiator obtained from Radiation Machinery Corporation, Parsippany, New Jersey. The glass vessel containing the lens mold during irradiation was a standard, relatively wide-mouth, two-hole rubber-stopped vessel permitting removal of air and replacement with nitrogen.

The lens molds (which do not form part of this invention) were manufactured from brass, glass and plastic. The mold consists of a lower concave part and an upper convex part. The surface of the convex part, when the mold is closed, reaches the surface of the concave section, except for the desired thickness of the collagen lens. The desired thickness is approximately 0.4 millimeters, preferably about 0.3 millimeters. Most lens material was finished with a trephine (cylindrical instrument with one razor-sharp circular cutting end), to a tapered edge lens. Instead of trephining, however, a lathe operation may also be used to finish the lens material.

EXAMPLE 4

A soft lens was prepared by procedures of Examples 1 and 3, except 12% clear collagen gels, a stainless steel mold and irradiation time of 20 hours were substituted. Again the resulting lens was optically clear, flexible and stable, and displayed excellent mechanical and physiological properties as a soft contact lens.

EXAMPLE 5

Solubilized, defatted collagen prepared in Example 3 was succinylated by the following procedure: Five grams of collagen were solubilized in 2 liters of acidified water (pH 3.0 HCl) and the pH thereafter adjusted to 9.0 with NaOH solution. Acetone (100 ml) containing 2 g succinic anhydride was added gradually to the collagen suspension. During the addition of succinic anhydride the pH of the collagen suspension was maintained at about 9.0 by adding NaOH solution. Succinylated collagen was precipitated by acidification to about pH 4.2, washed repeatedly with water and freeze-dried. Transparent succinylated collagen gel of pH 7 and an equal amount of tendon fibril collagen was placed on the lower mold part (brass) indicated and processed in the same way as Example 3. The resulting lens was completely transparent, pliable, and sufficiently strong to function as a soft contact lens. It is very comfortable to wear.

Collagen gel lenses are kept in sterile water or saline solution and display excellent storage properties. They have approximately the same refractive index as water itself. Should a lens become dehydrated, partly or completely, due to exposure to heat or sunlight, it is resotred unimpaired to its original condition by simple immersion in water, thus displaying its "perfect memory" characteristic. A lens purposely allowed to become dry and shriveled returned to normal in less than twenty minutes after water immersion.

All of the lenses prepared above can be modified by known optical techniques to prescription values. Thus, soft contact collagen lenses can be prepared for use by patients requiring known normal sight corrective measures, e.g., incorporation of spherical power.

The advantages of soft lenses made from fibril collagen and fibril collagen:solubilized collagen mixtures from a medical standpoint are summarized as follows:

1. Collagen gel lenses are highly permeable to water, oxygen, carbon dioxide, etc. and tests show that their gas diffusion characteristics are practically the same as pure water. To date, collagen is the only natural material used for contact lenses that can be so implanted without subsequent human rejection.
2. The collagen/water ratio of the cornea and the collagen contact lens are strikingly similar. These two materials are closely related structurally, physiologically and immunologically. All other contact lens materials are totally unrelated to the collagen protein of the cornea.

The advantages from the consumer or wearer standpoint are summarized as follows:

1. The gas and water vapor permeability of the collagen membranes make it ideally suited for a constant wear contact lens without disrupting essential metabolic processes in the cornea.
2. The similarity of this protein and the principal protein of the cornea make allergic and toxic reactions between the two very unlikely.
3. The low cost of preparation of the collagen lens material indicates a low cost to the consumer.
4. Collagen contact lenses are soft, pliable and transparent, and can be worn for extended periods of time without removal for cleaning, etc. Spherical power can be incorporated into them.

Having described the invention in sufficient detail that it may be practiced by those skilled in the art

What is claimed is:

1. As an article of manufacture a soft contact lens consisting of a lens-shaped, subsequently crosslinked gel of defatted fiber collagen, said gel comprising 1.0 to 30.0 wt. % collagen and the balance water.

2. A soft contact lens of claim 1 in which the fiber collagen is animal tendon collagen.

3. A soft contact lens of claim 1 in which the fiber collagen is beef tendon collagen.

4. A soft contact lens of claim 1 in which the fiber collagen is chemically modified collagen.

5. As an article of manufacture a soft contact lens consisting of a lens-shaped, subsequently crosslinked gel of a mixture of defatted fiber collagen and defatted solubilized collagen, said gel comprising 1.0 to 30.0 wt. % collagen and the balance water.

6. A soft contact lens of claim 5 in which the solubilized collagen is enzyme-solubilized telopeptide-poor collagen.

7. A soft contact lens of claim 5 in which the weight ratio of fiber collagen to solubilized collagen in the mixture ranges from about 1:10 to about 10:1.

* * * * *